(12) United States Patent
Dewing et al.

(10) Patent No.: US 7,421,067 B2
(45) Date of Patent: Sep. 2, 2008

(54) SYSTEM AND METHODOLOGY FOR PEER-TO-PEER VOICE COMMUNICATION EMPLOYING A PUSHED INTERACTIVE MULTIMEDIA ANNOUNCEMENT

(75) Inventors: Shane Richard Dewing, Sherman Oaks, CA (US); M. Dean Newton, Palm Springs, CA (US); Anthony Pierre Stonefield, Sherman Oaks, CA (US)

(73) Assignee: Emotive Communications, Inc., Woodland Hills, CA (US)

( * ) Notice: Subject to any disclaimer, the term of this patent is extended or adjusted under 35 U.S.C. 154(b) by 64 days.

(21) Appl. No.: 11/463,974

(22) Filed: Aug. 11, 2006

(65) Prior Publication Data

US 2007/0263798 A1 Nov. 15, 2007

Related U.S. Application Data

(60) Provisional application No. 60/745,134, filed on Apr. 19, 2006.

(51) Int. Cl.
*H04M 1/64* (2006.01)

(52) U.S. Cl. .............. 379/88.12; 379/88.13; 379/88.25; 370/352

(58) Field of Classification Search .............. 379/88.13, 379/88.19, 88.25, 88.12; 370/352
See application file for complete search history.

(56) References Cited

U.S. PATENT DOCUMENTS

| | | | |
|---|---|---|---|
| 4,850,007 A | 7/1989 | Marino et al. | |
| 5,652,784 A | 7/1997 | Blen et al. | |
| 6,014,439 A | 1/2000 | Walker et al. | |
| 6,038,305 A | 3/2000 | McAllister et al. | |
| 6,088,440 A | 7/2000 | Millar et al. | |
| 6,324,279 B1 | 11/2001 | Kalmanek, Jr. et al. | |
| 6,385,308 B1 | 5/2002 | Cohen et al. | |
| 6,567,658 B1 | 5/2003 | Van de Graaf | |
| 6,574,335 B1 | 6/2003 | Kalmanek, Jr. et al. | |
| 6,603,844 B1 | 8/2003 | Chavez, Jr. et al. | |
| 6,608,891 B1 | 8/2003 | Pelletier et al. | |
| 6,665,390 B1 | 12/2003 | Ekstrom | |
| 6,694,429 B1 | 2/2004 | Kalmanek, Jr. et al. | |

(Continued)

FOREIGN PATENT DOCUMENTS

WO  WO 2004/104851 A1  12/2004

(Continued)

OTHER PUBLICATIONS

Pixcall GMBH, Pixring mobile entertainment systems, 2003-2005.

(Continued)

*Primary Examiner*—Gerald Gauthier
(74) *Attorney, Agent, or Firm*—Gordon & Jacobson, PC

(57) ABSTRACT

A system, method and corresponding software application installed on communication devices of the system for communicating a media-based call alert from a calling-party device to a called-party device prior to establishing the voice call therebetween. The media-based call alert is played on the called-party device prior to (or concurrent with) the establishment of the voice call. Preferably, the communication of the media-based call alert is realized as part of a service that is available to subscribers of the service.

53 Claims, 6 Drawing Sheets

U.S. PATENT DOCUMENTS

| | | | |
|---|---|---|---|
| 6,829,233 B1 | 12/2004 | Gilboy | |
| 6,856,673 B1 | 2/2005 | Banks et al. | |
| 6,901,139 B2 | 5/2005 | Gonzalez et al. | |
| 6,968,179 B1 | 11/2005 | De Vries | |
| 6,970,553 B1 | 11/2005 | Gao et al. | |
| 6,975,719 B1 | 12/2005 | Gao et al. | |
| 7,076,043 B2 | 7/2006 | Curbow et al. | |
| 2002/0114437 A1 | 8/2002 | Nabkel et al. | |
| 2002/0131574 A1 | 9/2002 | Alleman | |
| 2003/0002657 A1 | 1/2003 | Seelig et al. | |
| 2003/0078890 A1 | 4/2003 | Schmidt et al. | |
| 2003/0086558 A1 | 5/2003 | Seelig et al. | |
| 2003/0185360 A1 | 10/2003 | Moore et al. | |
| 2005/0102381 A1 | 5/2005 | Jiang et al. | |
| 2005/0209861 A1 | 9/2005 | Hewes et al. | |
| 2006/0023862 A1 | 2/2006 | Sutcliffe | |
| 2006/0026277 A1 | 2/2006 | Sutcliffe | |
| 2006/0133590 A1 | 6/2006 | Jiang | |
| 2006/0262913 A1* | 11/2006 | Cook et al. | 379/88.19 |
| 2007/0030338 A1 | 2/2007 | Jiang et al. | |
| 2007/0047523 A1 | 3/2007 | Jiang | |

FOREIGN PATENT DOCUMENTS

| | | |
|---|---|---|
| WO | WO 2005/013595 A1 | 2/2005 |
| WO | WO 2005/117396 A1 | 12/2005 |
| WO | WO 2006/130783 A2 | 12/2006 |

OTHER PUBLICATIONS

Nokia Corporation, IP multimedia—a new era in communications, 2004.

* cited by examiner

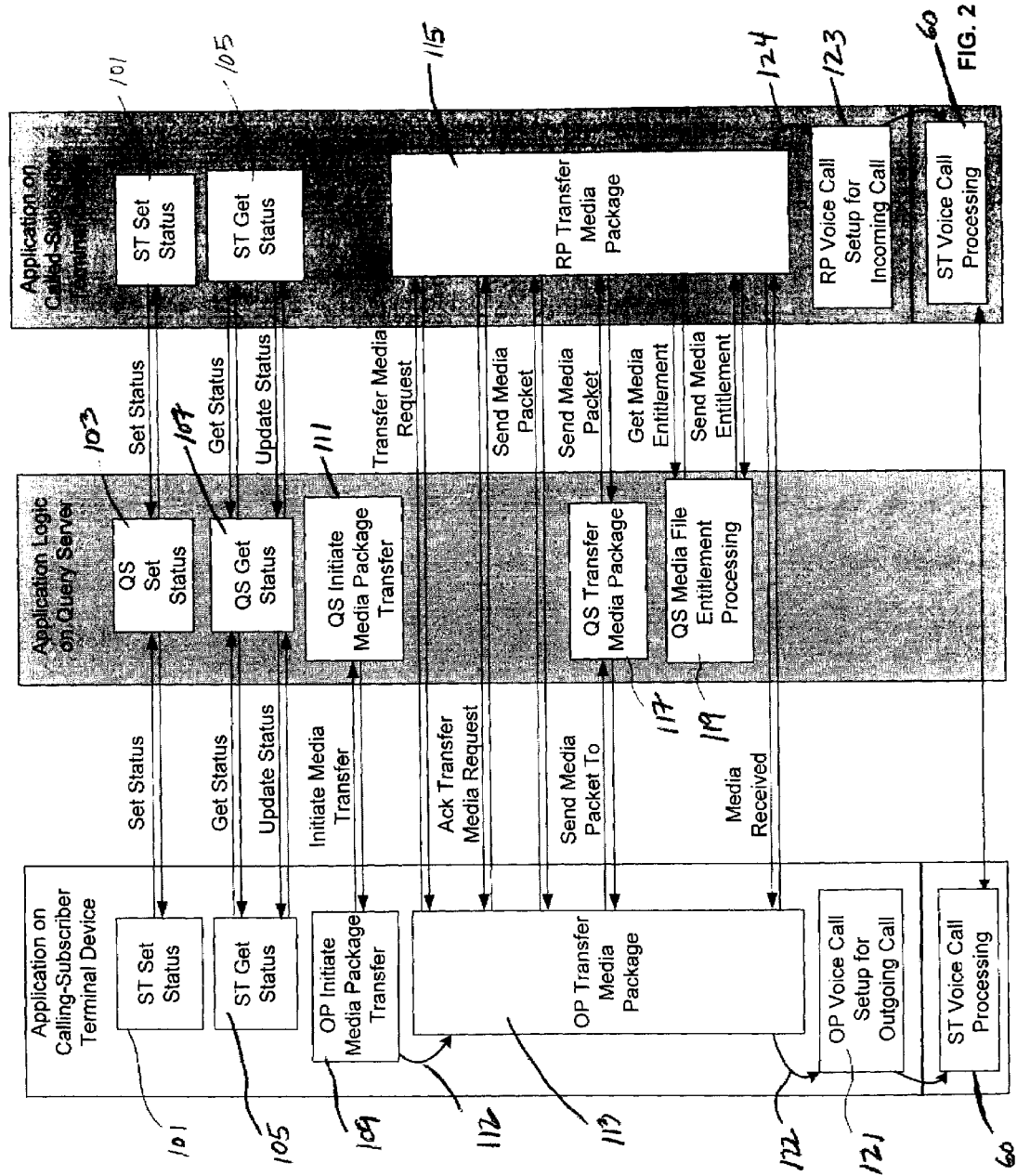

"To make outbound Push Tone calls, register for the Push Tone subscription service which will automatically add $2.99 monthly charge to your account. This subscription allows you make up to 200 Push Tone calls using any of the ringtones that you have on your phone or any ringtones you buy or voice/video recordings you make. Standard prices apply for buying new ringtones for your own use or to send as *My Ring* gifts to people who you call them with.

Please review the standard Terms and Conditions, below.
 [Subscribe] / [Unsubscribe]

[Next] [Save] [Back] [Help] [Cancel]

FIG. 3

| Buddy | Online | Get Calls From | Can Make Calls To |
|---|---|---|---|
| AntoinT | Yes | Yes | Green (Yes) |
| BrianC | No | Yes | Red (No) |
| CharlyD | Yes | No | Unknown <Check?> |
| Xavier | No | Yes | Green (Yes) |

[Next] [Save] [Back] [Help] [Advanced] [Cancel]

FIG. 4

SYSTEM AND METHODOLOGY FOR PEER-TO-PEER VOICE COMMUNICATION EMPLOYING A PUSHED INTERACTIVE MULTIMEDIA ANNOUNCEMENT

This application claims the benefit of U. S. Provisional application No. 60/745,134 filed on Apr. 19, 2006.

BACKGROUND OF THE INVENTION

1. Field of the Invention

This invention relates broadly to communication systems. More particularly, this invention relates to communications systems that provide for peer-to-peer voice communication.

2. State of the Art

In modern communication systems, when a call is made to a called party, a ring tone is played at the called party's telephony device in order to announce the incoming call to the called party. In the case of a traditional wire line telephone, the ring tone is played in response to a 90-volt 20-hertz AC wave generated by the central office switch that is connected to the called party's telephony device. In the case of a wireless communication system, the ring tone is typically generated on the called party's mobile handset in response to a call connection request communicated thereto from a switching center or the like. Mobile handsets typically also allow for a vibrating alert to announce incoming calls. The vibrating alert is especially useful in noisy environments, in places where ring tone noise would be disturbing, and for the hearing impaired.

Newer wireless mobile handsets allow the user to select the ring tone from a collection of ring tones, and also to select a ring tone for each user listed in the handset's phone book. When the handset receives a call connection request from a user listed in the handset's phone book, the ring tone associated with the user is played to announce the incoming call. Newer mobile handsets can also use short pieces of music as ring tones, and the sale of these ring tones has become a major sector of the mobile music industry.

Early mobile handsets had the ability to play only monophonic ring tones, which are short tunes played with simple tones. These early phones also had the ability to have ring tones programmed into them using an internal ring tone composer. Various formats were developed to enable ring tones to be sent via SMS text, for example RTTTL encoding.

Modern mobile handsets are now able to play more complex polyphonic ring tones. Polyphonic means that multiple notes can be played at the same time using instrument sounds such as guitar, drums, electronic piano, etc. Polyphonic ring tones are typically pieces of recorded music or other sounds contained in a conventional audio file (e.g., AAC, MP3, WMA, WAV, QCP, or AMR format) and played by suitable software applications that execute on the mobile handset. Polyphonic ring tones can also be based upon midi sequences. Many polyphonic capable handsets are able to play standard midi files, others play sp-midi files. The sp-midi file encodes a scalable polyphonic ring tone. The number of available channels that can be concurrently played on the handset dictates the notes played by the handset in rendering the sp-midi file. More particularly, an older polyphonic capable handset may play 4 notes at once, while a newer handset may be capable of rendering 128 notes at once.

Ring tones have proven a popular method of personalizing mobile handsets. In response to this demand, wireless carriers and other content providers have developed businesses that generate significant revenue resulting from the distribution of ring tones to mobile handset users. However, personalization of the ring tones played on mobile handset is controlled exclusively by the user of the handset. This limits the amount of personalization that can be achieved as part of the voice call process and thus limits potential revenues that could be derived by additional personalization of the voice call process.

U.S. Patent Publication No. 2006/0026277 to Sutcliffe describes a system and method for "pushing" a caller-defined multimedia announcement or alert within the call set-up process. It is possible for the called party to hear or see the caller-defined multimedia announcement before answering the incoming call. The caller-defined multimedia content is transferred during call set-up and replaces standard ring tones on the recipient's mobile handset. This process allows for additional personalization of the voice call process. However, U.S. Patent Publication No. 2006/0026277 fails to address many important issues that arise in this process, including but not limited to user control and management of the multimedia announcement communication process on a system wide basis and on a user by user basis, and access control over the multimedia content transferred to the recipient's mobile handset.

Thus, there remains a need in the art for methods, systems and services based thereon for peer-to-peer voice call communication that allow for additional personalization of the voice call process while also providing user control and management of the multimedia announcement communication process on a system wide basis and on a user by user basis, and access control over the multimedia content transferred to the recipient's mobile handset.

SUMMARY OF THE INVENTION

It is therefore an object of the invention to provide a system and methodology for peer-to-peer voice communication that allows for additional personalization of the voice call process.

It is another object of the invention to provide a system and methodology for peer-to-peer voice communication that allows for potential revenue growth from such additional personalization of the voice call process.

It is a further object of the invention to provide such a system and methodology that enriches the voice call process with customizable ring tones.

In accord with these objects, which will be discussed in detail below, a method, system and software application installed on communication devices of the system provides for communicating a media-based call alert from a calling-party device to a called-party device prior to establishing the voice call therebetween. The media-based call alert is played on the called-party device prior to (or concurrent with) the establishment of the voice call. Preferably, the communication of the media-based call alert is realized as part of a service that is available to subscribers of the service.

According to one embodiment of the invention, a query server is used to maintain presence data and permissions data for users of the service. The presence data provides an indication of the availability of users on a user-by-user basis and is dynamically updated. The permissions data is used to selectively initiate (or not initiate) communication of the media-based call alert and is dynamically updated by users to provide users with the ability to selectively control the reception of such media-based call alerts on a global basis as well as on a user-by-user basis.

According to another embodiment of the invention, the media content of the media-based call alert is protected by digital rights management (DRM) information to allow for controlled access and distribution of such media content as desired by content providers and users, when appropriate.

Additional objects and advantages of the invention will become apparent to those skilled in the art upon reference to the detailed description taken in conjunction with the provided figures.

BRIEF DESCRIPTION OF THE DRAWINGS

FIG. 2 is a block diagram of exemplary functionality embodied by the network elements of FIG. 1 in carrying out a voice call communication process in accordance with the present invention.

FIG. 3 is a schematic diagram of an exemplary graphical user interface that is displayed on the terminal devices of FIG. 1 for registering and subscribing to a communication service in accordance with the present invention.

FIG. 4 is a schematic diagram of an exemplary buddy list interface that is displayed on the terminal devices of FIG. 1 for communicating presence information and permissions associated with subscribers of the communication service of the present invention, and for invoking voice calls to such subscribers.

DETAILED DESCRIPTION OF THE PREFERRED EMBODIMENTS

Figure 1:
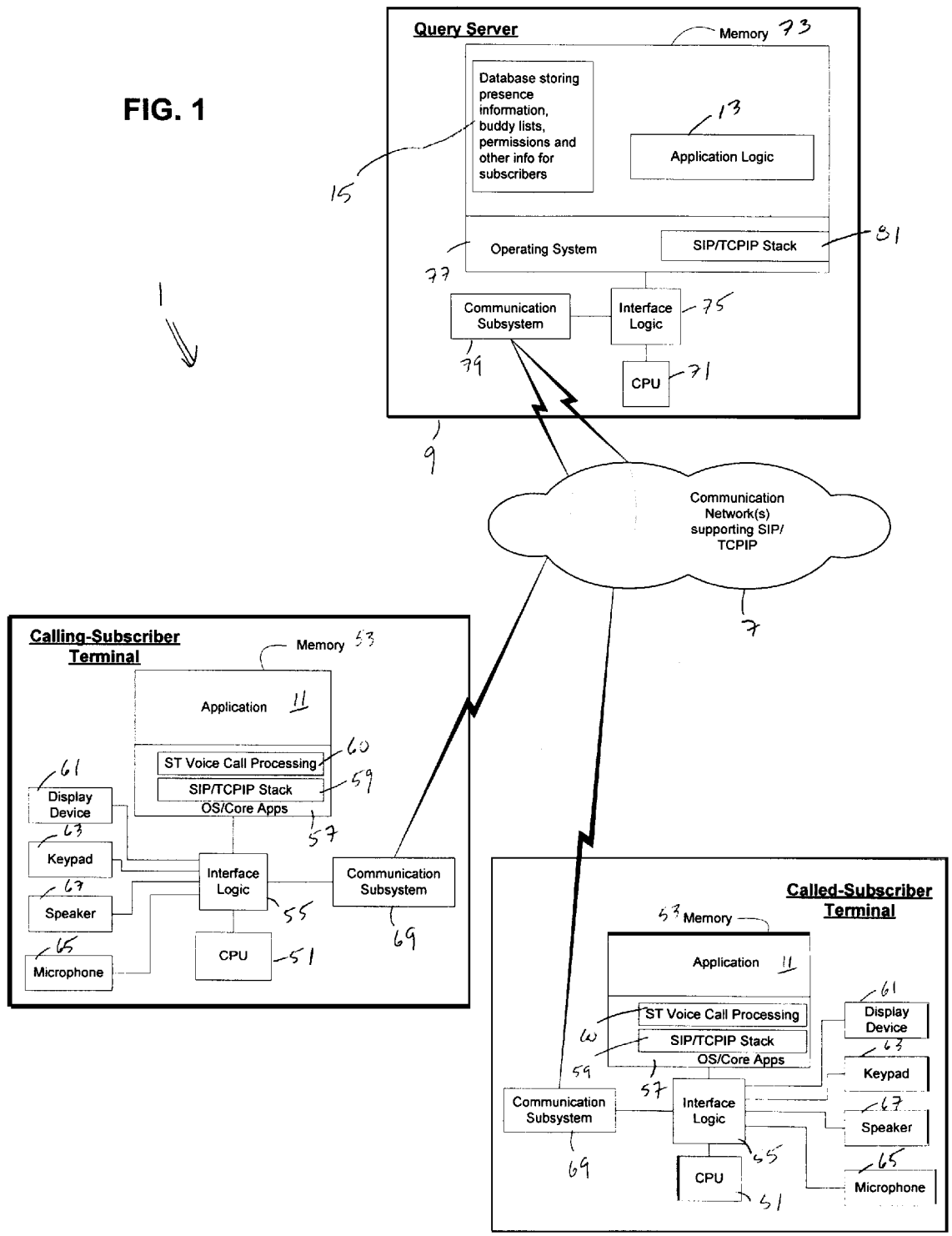
FIG. 1 is a functional block diagram of a system for peer-to-peer voice communications that employs push-type communication of a media-based announcement from a calling-subscriber device to a called-subscriber device in accordance with the present invention.

Turning now to FIG. 1, there is shown a schematic diagram of an exemplary communication system 1 that enables a ringtone or other media-based announcement or alert (referred to below as a "media-based call alert") to be communicated from a calling-subscriber terminal device 3 to a called-subscriber terminal device 5 over one or more communication networks 7. The media-based call alert is communicated to the called-subscriber terminal device 5 prior to establishing the voice call between the calling-subscriber terminal device 3 and the called-subscriber terminal device 5, in a manner which can vary dependent upon the equipment and communication protocols of the communication network (s) 7 and the subscriber terminal devices. In many instances, such call establishment involves provisioning the communication network(s) 7 to establish communication channels over the communication network(s) 7 that allow for duplex communication between the subscriber terminal devices. The media-based call alert is played on the called-subscriber terminal device 5 prior to (or concurrent with) the establishment of the voice call between the subscriber terminal devices. The communication of the media-based call alert is realized as part of a service that is available to subscribers of the service. The voice call between subscriber terminal devices 3, 5 can be carried over a suitable telephony connection (e.g., a wireless telephony connection and/or a "voice over IP" data connection). In addition, the voice call between subscriber terminal devices 3, 5 can be supplemented with ancillary data communication (e.g., video data for a video call, data exchange for whiteboarding, file sharing or other collaborative features).

The subscriber terminals 3, 5 can be any of a number of communication devices including cellular handset devices, personal digital assistants, personal computers, networked kiosks, VOIP phone, traditional phone connected to a VOIP gateway, and the like. FIG. 1 illustrates, in block diagram form, the architecture of an exemplary embodiment of the subscriber terminals, including a central processor unit 51 that is interfaced to memory 53 by interface logic 55. The memory 53, which is typically realized by persistent memory (such as one or more ROM memory modules and/or one or more flash memory modules) as well as non-persistent memory (such as one or more DRAM modules), stores an operating system and core applications 57 as well as an application 11, which is referred to below as the "media-based call alert application". The central processor unit 51 also interfaces to a display device 61 (e.g., a liquid crystal display panel), a keypad or keyboard 63 and/or other user input device (e.g., a touch screen disposed on the display device 61), a microphone 65 for voice input, and a speaker 67 for voice/audio output. The central processor unit 51 interfaces to a communication subsystem 69 that provides for bidirectional communication with the communication network 7.

A query server 9 interfaces to the network 7. FIG. 1 illustrates, in block diagram form, the architecture of an exemplary embodiment of the query server 9, including a central processor unit 71 that is interfaced to memory 73 by interface logic 75. The memory 73, which is typically realized by persistent memory (such as one or more ROM memory modules and/or one or more flash memory modules) as well as non-persistent memory (such as one or more DRAM modules), stores an operating system 77 as well as application logic 13. The operating system 77 and application logic 13 are typically stored in a storage device, such as magnetic disk drive or disk array (not shown), and loaded into memory 73 as needed. The central processor unit 71 interfaces to a communication subsystem 79 that provides for bidirectional communication with the communication network 7.

The application logic 13 of the query server 9 maintains a database 15 that stores presence information which provides communication states associated with the subscribers of the service. Such communication states are selected from a variety of states that indicate the availability of the corresponding subscriber to receive communication as part of the service. For example, in the preferred embodiment, the presence information represents at least an "opt-in" state (meaning that the subscriber is available for voice call communication initiated as part of the service) and an "opt-out" state (meaning the subscriber is not available for voice call communication initiated as part of the service). A subscriber updates his/her presence information by execution of the application 11 on a respective subscriber terminal device, which communicates with the query server 9 to update the presence information of the subscriber maintained therein.

In the preferred embodiment of the invention, the database 15 of the query server 9 also maintains a buddy list for each subscriber. The buddy list for a given subscriber is created by the given subscriber and identifies other subscribers of the service that are known by the given subscriber. The buddy list can possibly identify subscribers by their mobile identifier number, screen-name, email address, etc. The buddy list for a given subscriber also includes (or points to) permission data for each subscriber on the list. The permission data, which is set by the given subscriber, allows the given subscriber to selectively allow/prohibit the receipt of media-based call alert communications originating from other subscribers in the buddy list. The buddy list for a given subscriber also includes (or points to) status data that provides an indication whether the other subscribers in the buddy list are allowing or prohibiting (or status unknown) the receipt of media-based call alert communications originating from given subscriber. Preferably, the buddy list for a given subscriber is created by execution of the application 11 on a respective subscriber terminal device by the given subscriber and uploaded to the query server 9 for remote storage therein. The buddy list can be downloaded to the application 11 for access by the given subscriber as needed.

In alternate embodiments, the presence information can encompass other communication services (e.g., instant messaging communication services, VOIP communication services, etc) and represent various degrees of availability of the subscriber (e.g., Unavailable, Available-Desktop, Available-Mobile, Busy, Idle(Away)). Moreover, presence information, buddy lists, permission data, or parts thereof can be maintained in the central registry (or possibly in a distributed registry) and updated by communication between the subscriber terminals 3, 5 and the registry via a communication interface therebetween. In such embodiments, the presence information, buddy lists, permission data, or parts thereof maintained in the registry can be communicated to the query server 9 via a communication interface therebetween.

In the preferred embodiment, the communication network(s) 7, the operating system 57 of the subscriber terminal devices and the operating system 77 of the query server 9 provide support for the TCP/IP networking protocol and the Session Initiation Protocol (SIP) in order set up communication sessions between either one of the subscriber terminal devices 3, 5 and the query server 9 and communication sessions between the subscriber terminal devices 3, 5. Once set up, the communication sessions employ Real-Time Transport Protocol (RTP) packets as the carrier of the information itself. Support for SIP in the communications network 7 requires proxy and registrar network elements (not shown) as is well known. Support for SIP by the subscriber terminals is realized by a SIP/TCPIP stack 59 included as part of the operating system as is well known. Support for SIP by the query server is realized by a SIP/TCPIP stack 81 included as part of the operating system as is well known.

The application 11 executing on the subscriber terminals and the application logic 13 of the query server 9 include software-based functionality for communicating a media-based call alert from the calling-subscriber terminal device 3 to the called-subscriber terminal device 5 prior to establishing the voice call therebetween, and for playing the media-based call alert on the called-subscriber terminal device 5 prior to (or concurrent with) the establishment of such voice call. In the preferred embodiment, such software-based functionality is logically partitioned into a set of functions shown in FIG. 2 and described below in more detail. Note that for simplicity of description, the functionality of the application 11 for originating calls (i.e., calling-subscriber functionality) and for receiving calls (i.e., called-subscriber functionality) is shown and described separately with respect to the calling-subscriber terminal 3 and the called-subscriber terminal device 5. However, because such subscriber terminal devices can be used as both calling- and called-subscriber terminal devices, the application logic 11 stored and executed on each respective subscriber terminal device includes the collection (e.g., union) of functions separately described herein.

Turning now to FIG. 2 in conjunction with FIG. 1, the Subscriber Terminal (ST) Set Status function 101 is executed on both the calling-subscriber terminal device 3 and the called-subscriber terminal device 5 during the media-based call alert communication process. It is responsible for updating the presence information (e.g., "opt-in"/"opt-out" status) of the particular subscriber that is executing the application 11 on the respective subscriber terminal device. The updated presence information is carried as part of a "Set Status" command communicated from the respective subscriber terminal device to the query server 9. The Query Server (QS) Set Status function 103 on the query server 9 receives and parses the "Set Status" command, collects the updated presence information from the received "Set Status" command, and updates the presence information stored in the database 15 for the particular subscriber in accordance with the received updated presence information, if needed.

Preferably, the database 15 is initialized such that the presence information for the particular subscriber has a system-wide default value (e.g., "opt-out" status), and the initial execution of the application 11 by the particular subscriber invokes the ST Set Status function 10 to set the presence information for the particular subscriber in the database 15 to a subscriber-modifiable default state (e.g., "opt-in"). The presence information can then be updated by subscriber interaction with a graphical user interface presented to the particular subscriber, which again invokes the ST Set Status function 101 to update the presence information for the particular subscriber in the database 15.

The ST Get Status function 105 may be executed on both the calling-subscriber terminal device 3 and the called-subscriber terminal device 5 during the media-based call alert communication process. The ST Get Status function 105 cooperates with QS Get Status Function 107 on the query server 9 to synchronize the buddy list and associated permissions data and status data of the particular subscriber that is executing the application 11 on the respective subscriber terminal device. The updated buddy list and associated permission data is carried as part of a "Get Status" command communicated from the respective subscriber terminal device to the query server 9, which updates the database 15 accordingly. Updates to the status data associated with the buddy list are carried as part of an "Update Status" command communicated from the query server 9 to the respective subscriber terminal device, which updates the status data stored on the respective subscriber terminal device as needed. In the preferred embodiment, the ST Get Status function 105 is carried out by both the calling-subscriber terminal device and the called-subscriber terminal device on a predefined, periodic basis (e.g., every 300 seconds) so as to maintain the query server 9 with up-to-date permissions and status data for subscribers of the service. The period between the ST Get Status function calls can be configurable on each subscriber terminal device and/or by a parameter setting on the query server 9.

In alternate embodiments, presence information, buddy lists, permission data, or parts thereof can be maintained in the central registry (or possibly in a distributed registry) and updated by communication between the subscriber terminals 3, 5 and the registry via a communication interface therebetween. In such embodiments, the presence information, buddy lists, permission data, or parts thereof maintained in the registry can be communicated to the query server 9 via a communication interface therebetween.

A calling subscriber initiates the communication of a media-based call alert to a called subscriber, which is typically accomplished by user interaction with a graphical user interface displayed by the application 11 on the display device 61 of the calling-subscriber terminal device 3. In response thereto, the Originating Party (OP) Initiate Media Package Transfer function 109 is executed on the calling-subscriber terminal device 3. It communicates an "Initiate Media Package Transfer" command to the query server 9. The "Initiate Media Package Transfer" command identifies the called subscriber typically by the user name (e.g., screen name or email address assigned to the called subscriber). In response thereto, the QS Initiate Media Package Transfer function 111 executing on the query server 9 accesses the database 15 to retrieve the presence information for the called subscriber. The query server 9 can also retrieve the permissions associated with the buddy list of the called subscriber. In distributed architectures, the query server 9 may be required to communicate with a central registry (or possibly a distributed registry) in order to retrieve the appropriate presence information, buddy list, permissions data or parts thereof for the called subscriber.

The query server 9 then checks whether the permissions data of the called subscriber indicates that the media-based call alert communication originating from the calling subscriber should be "allowed" or "blocked." The serviceability status (i.e., "authorized" or "not-authorized") for the media-based call alert communication is returned to the calling-subscriber terminal device 3. Such serviceability status is based upon the presence information and/or permission data for the called subscriber (e.g., the serviceability status is "authorized" in the event that the presence information for the called-subscriber indicates the "opt-in" state and the permissions data for the called subscriber indicate that media-based call alert communication originating from the called subscriber should be "allowed"; or the serviceability status is "not-authorized" in the event that the presence information for the called-subscriber indicates the "opt-out" state or the permissions data for the called subscriber indicate that media-based call alert communication originating from the called subscriber should be "blocked"). The OP Initiate Media Package Transfer function 109 determines if the returned status indicates that the called subscriber is "available", and if so initiates the OP Transfer Media Package function 113 as described below. The transition from the OP Initiate Media Package Transfer function 109 to the OP Transfer Media Package function 115 is designated by arrow 112. If the returned status indicates that the called subscriber is "not available", the OP Initiate Media Package Transfer function 109 can display such status to the calling subscriber on the display device 61 and/or possibly raise other alerts on the calling-subscriber terminal device 3, and then end the processing of the media-based call alert communication to the called subscriber.

Note that in response to the "Initiate Media Package Transfer" command, the QS Initiate Media Transfer function 111 may initiate an Accounting Function (not shown) that performs the following tasks: (i) creating a transaction/call record for reporting purposes, and/or (ii) validating that the calling subscriber and the called subscriber can be correctly billed for the media-based call alert communication of the present invention, if necessary.

The OP Transfer Media function 113 is executed on the calling-subscriber terminal device 3. It communicates a "Transfer Media Request" command to the called-subscriber terminal device 5. The "Transfer Media Request" command preferably includes the following: (i) a file name and possibly corresponding file type of one or more media files that make up the media-based call alert, (ii) the size of these media file(s), and (iii) digital rights management (DRM) information for the media file(s). Such DRM information preferably includes:

- permissions/entitlements that designate consumption restrictions imposed on these media file(s), and
- URLs (or IP addresses) for one or more servers for obtaining keys for decrypting the media file(s) that make up the media-based call alert and for obtaining the requisite permissions/entitlements.

The permissions/entitlements that can be used to designate consumption restrictions imposed on the media file(s) of the media-based alert preferably include the following:

- Play, No Save (the called-subscriber terminal device can play the media content, but cannot save the media content locally. Ephemeral copy only);
- Play, Save, Unlimited Use, No Forward (the called-subscriber terminal device can play the media content for an unlimited number of times, and can use media for intended utility (e.g. media-based call alert), but cannot forward or copy the media content off of the called-subscriber terminal device);
- Play x times, Save, Unlimited Use, No Forward (similar to Play, Save, Unlimited Use, No Forward, but the called-subscriber terminal device can only play the media content x number of times, then the media content is permanently deleted from device);
- Play until dd-mm-yyyy, Save, Unlimited Use, No Forward [similar to Play, Save, Unlimited Use, No Forward, but the media content is permanently deleted from device after dd-mm-yyyy);
- any of the above with Limited Use (the media content can only be used for specific use, e.g., media-based call alert);
- any of above with pass along/forward rights (the media content can be passed to another device in a super distribution scheme; note that the actual media is not transferred—what is sent to recipient device is an invitation to download appropriate entitlement and media.

The RP Transfer Media Package function 115 executing on the called-subscriber terminal device 5 processes the "Transfer Media Request" command to determine if the media file(s) identified therein can be received and processed by the called-subscriber terminal device 5, and returns the "Ack Transfer Media Request" command to the calling-subscriber terminal device 3. The "Ack Transfer Media Request" command preferably includes the following: (i) a preferred format for the media file(s), (ii) available memory on the called-subscriber terminal device 5, and (iii) acknowledgement of ability to comply with the DRM restrictions imposed on the media file(s).

Upon receipt of the "Ack Transfer Media Request" command, the OP Transfer Media Package function 113 executing on the calling-subscriber terminal device 3 validates the information supplied therein for compliance. Such validation preferably confirms that the called-subscriber terminal device 5 can accept and consume the media file(s) that make up the media-based call alert as intended and in the format provided by the calling-subscriber terminal device 5. If such validation is successful, the OP Transfer Media Package function 113 initiates communication of the "Send Media Packet" command to the called-subscriber terminal device 5. The "Send Media Packet" command preferably includes the following: (i) the media file(s) that make-up the media-based call alert in encrypted form, (ii) meta-data relevant to these media file(s) (e.g., name, creator(s), performer(s) etc.), and (iii) DRM information for the media file(s) as described above. Upon receipt of the "Send Media Packet" command, the RP Transfer Media Package function 115 initiates communication of a corresponding acknowledge command that is returned back to the calling-subscriber terminal device 3. Upon receipt of this acknowledge command, the OP Transfer Media Package function 113 is placed into a wait state pending receipt of the "Media Received" command to be issued by the RP Transfer Media Package function 115 as described below.

In the event that the validation of the "Ack Transfer Media Request" command fails, the OP Transfer Media Package function 113 can display such status to the calling subscriber on the display device 61 and/or possibly raise other alerts on the calling-subscriber terminal device 3, and then end the processing of the media-based call alert communication to the called subscriber.

If the processing of "Ack Transfer Media Request" command indicates that the called-subscriber terminal device 3 requires the media-based caller alert in a different format, the OP Transfer Media Package function 113 can initiate the "Send Media Packet To" command to the query server 9. The "Send Media Packet To" command preferably includes the following information: (i) the address of the called-subscriber terminal device 5, (ii) optionally, details about the media file(s) that make up the media-based call alert, (iii) optionally, the media file(s), (iii) the required format for the media file(s) as requested by the called subscriber in the "Ack Transfer Media Request" command, and (iv) DRM information for the media file(s) as described above. Upon successful receipt of the "Send Media Packet To" command, QS Transfer Media Package function 117 executing on the query server 9 sends a corresponding acknowledge command back to the calling-subscriber terminal device 3. Upon receipt of this acknowledge command, the OP Transfer Media Package function 113 is placed into a wait state pending receipt of the "Media Received" command to be issued by the RP Transfer Media Package function 115 as described below.

The QS Transfer Media Package function 117 operates to either (i) transcode the media file(s) received from the calling-subscriber terminal device 3 into the suitable format as identified by the calling-subscriber device 3 in the "Send Media Packet To" command or (ii) acquire a new copy of the media file(s) in the suitable format. The new copy can be acquired from a media store maintained by the query server 9 or a media store operably coupled thereto. Upon generating (or acquiring) the media file(s) in the suitable format, the QS Transfer Media Package function 117 initiates the communication of the "Send Media Packet" command (which is described above in detail) to the called subscriber terminal device 5. Upon receipt of the "Send Media Packet" command, the RP Transfer Media Package function 115 initiates communication of a corresponding acknowledge command that is returned back to the query server 9, thereby indicating successful delivery of the "Send Media Packet" command to the called-subscriber terminal device 3.

After issuing the acknowledge command in response to successful delivery of a "Send Media Command" communicated by the calling-subscriber terminal device 3 or by the query server 9, the RP Transfer Media Package function 115 issues a "Get Media Entitlement" command to the query server 9. The QS Media File Entitlement Processing function 119 executing on the query server 9 receives the "Get Media Entitlement" command and obtains the necessary decryption key(s) and DRM license(s) associated with the media file(s) of the media-based call alert. Such DRM licenses can be stored locally on the query server 9 or obtained from another server operably coupled thereto. Upon acquisition of the necessary decryption key(s) and DRM license(s), the QS Media File Entitlement Processing function 119 forwards the necessary decryption key(s) and DRM license(s) to the called-subscriber terminal device 5 as part of a "Send Media Entitlement" command communicated thereto. Alternatively, the Media File Entitlement Processing function 119 can be carried out as part of the called-subscriber terminal device 5 to interact with the appropriate servers to acquire the necessary decryption key(s) and DRM license(s) for the media file(s) that make up the media-based call alert.

The RP Transfer Media Package function 115 receives the "Send Media Entitlement" command and the necessary decryption key(s) and DRM license(s) included therein. Upon receiving the "Send Media Entitlement" command, the RP Transfer Media Package function 115 initiates communication of a "Media Received" command to the calling-subscriber terminal device 3. As described above, the OP Transfer Media Package function 113 is placed into a wait state for receipt of the "Media Received" command. Upon receipt of this "Media Received" command, the OP Transfer Media Package function 113 initiates communication of a corresponding acknowledge command that is returned back to the called-subscriber terminal device 5 and then initiates the OP Voice Call Setup function 121. The transition from the OP Transfer Media Package function 113 to the OP Voice Call Setup function 121 is designated by arrow 122.

Upon receiving the acknowledge signal that is returned from the calling-subscriber terminal device 3 indicating receipt of the "Media Received" command, the RP Transfer Media Package function 115 initiates the RP Voice Call Setup function 123. The transition from the RP Transfer Media Package function 115 to the RP Voice Call Setup function 123 is designated by arrow 124.

The OP Voice Call Setup function 121 cooperates with the ST Voice Call Processing logic 60 executing on the calling-subscriber terminal device 3 in order to provision a voice call to the called-subscriber terminal device 5 using available network resources. Such functionality may tear down the SIP session between the calling and called-subscriber terminal devices 3, 5 before provisioning the voice call. Such provisioning is preferably realized by passing a phone number (or other identifier) of the called-subscriber terminal device 5 to the ST Voice Call Processing logic 60 via an application programming interface. In the preferred embodiment, the ST Voice Call Processing logic 60 is realized as part of the operating system 57 of the subscriber terminal and embodies the necessary functionality in provisioning the voice call between the calling subscriber terminal 3 and the called subscriber terminal device 5. The voice call can be accomplished over a cellular network, a data packet network (e.g., VOIP call over the Internet), or other suitable communication network.

Figure 7:
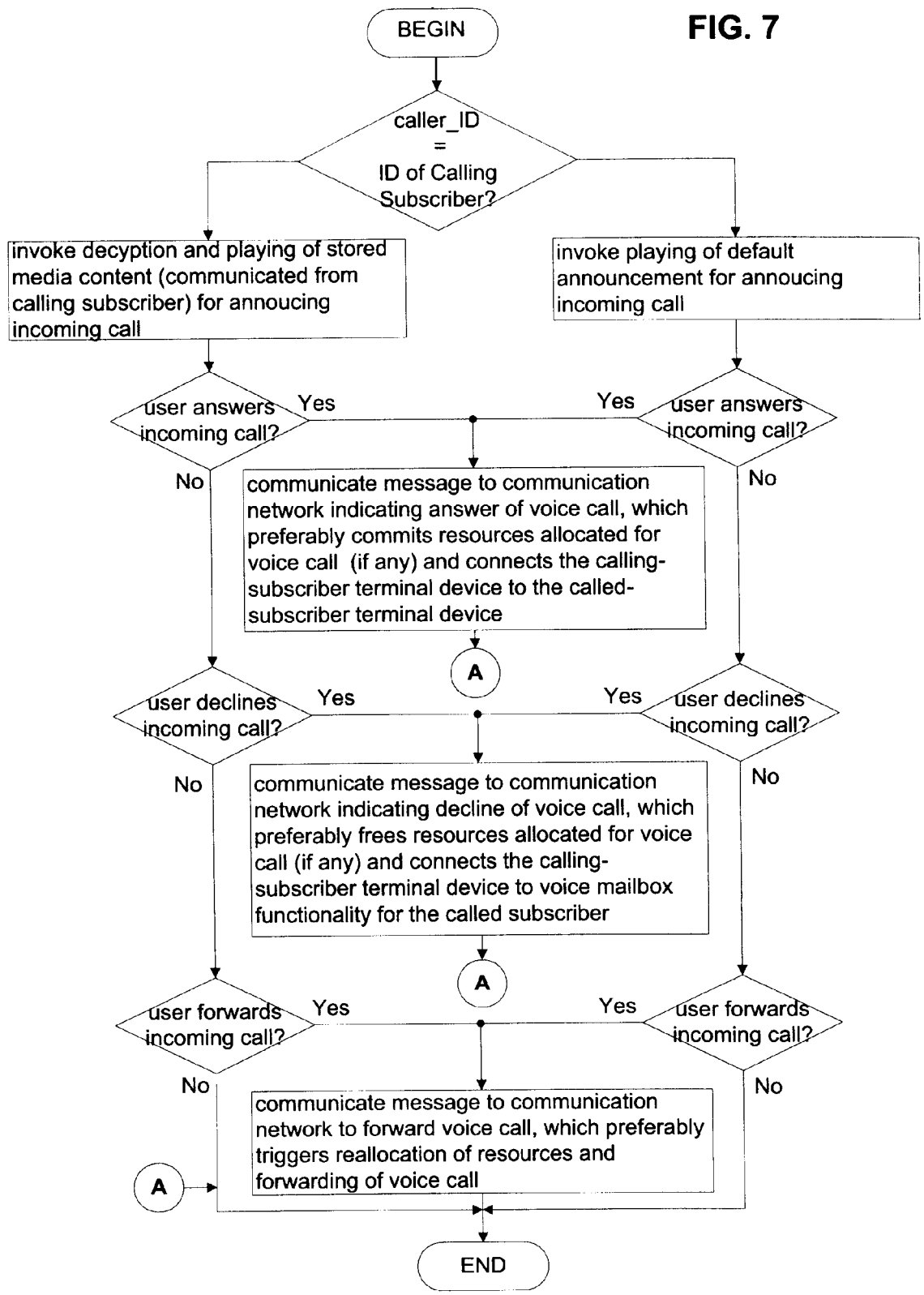
FIG. 7 is a flow chart illustrating exemplary operations carried out by the RP Voice Call Setup block of the application executing on the called-subscriber terminal of FIG. 2 in accordance with the present invention.

The RP Voice Call Setup function 123 cooperates with the ST Voice Call Processing logic 60 executing on the called-subscriber terminal device 5 such that called-subscriber terminal device 5 is placed in "incoming call wait mode". In this mode, the processing of all incoming voice calls is diverted to the RP Voice Call Setup function 123. More particularly, the ST Voice Call Processing Logic 60 passes caller identifier information for each incoming call to the RP Voice Call Setup Function 123. The RP Voice Call Setup function 123 validates this caller identifier information against caller identifier information that it has stored for the calling subscriber. If the caller identifier information for the incoming call does not match the stored caller identifier information, the RP Voice Call Setup function 123 releases the call such that the call is handled by the ST Voice Call Processing Logic 60. If the caller identifier information for the incoming call does match the stored caller identifier information, the RP Voice Call Setup function 123 bypasses the traditional incoming call processing and invokes the appropriate DRM client on the called subscriber terminal 5 to decrypt the media file(s) that make up the media-based call alert, which passes the media file(s) in decrypted form to the appropriate media player (which is typically stored as part of the core applications and operating system 57 of the called-subscriber terminal device 3). In this manner, the media player executing on the called-subscriber terminal device 5 plays the media file(s) that make up the media-based call alert as received by the RP Transfer Media Package function as described above. The DRM client cooperates with the media player to conform to the consumption restrictions (e.g., execute and not save) imposed on the media file(s) as dictated by the DRM information associated therewith. An example of such processing is illustrated in the flow chart of FIG. 7.

The RP Voice Call Setup function 123 also invokes a graphical user interface that allows the called subscriber to select one of various actions with respect to the incoming call (Answer, Decline, Forward, etc). User selection of a given action causes the RP Voice Call Setup function 123 to cooperate with the ST Voice Call Processing logic 60 to carry out the desired action (e.g., answer the call, decline the answering of the call, forward the call to another number). In this manner, the media file(s) that make up the media-based call alert is played on the called-subscriber terminal device 5 prior to (or concurrent with) the establishment of the voice call between the subscriber terminal devices 3, 5.

In the preferred embodiment, the application 11 may be discovered and installed onto a subscriber terminal device in one of four ways:

i) a user discovers the application while browsing through the application icons, or through the pre-installed applications, on his or her device's menu. In this configuration, first-time execution of the application 11 will trigger the initialization (set up) process as described below.

ii) user discovers the application 11 displayed on a Web site, a Wap site, or other mechanism for public distribution therefrom; promoted in text or instant message or on a client application; promoted on an traditional-media advertisement (print, TV or radio); or promoted on a remote vending terminal (e.g. a WiFi or Bluetooth kiosk). The user orders the application 11, which results in the application 11 being downloaded onto the user's device where it will automatically install and attempt to commence the initialization (set up) process, as described below.

iii) the application 11 is promoted by a subscriber who wants to use the application 11 to place a call to the user; for example, the user may receive a textual message (via SMS, instant message or a pop-up in a client application) saying "<Calling Party's number> is trying to connect with you with a 'Push Ringer Media Call.' To accept please download (free) and install the 'Push Ringer Media Call' application—Accept/Decline". Acceptance by the user results in the application 11 being downloaded onto the user's device where it will automatically install and attempt to commence the initialization (set up) process, as described below. During this process the calling subscriber preferably is displayed a message providing an indication that the user has accepted an invitation to download and install the application 11 and to stand-by for connection.

iv) a user whose device does have the application 11 pre-installed (or otherwise installed) but has not been initialized (set up), is a recipient of an attempted media-based call alert communication. The application 11 when installed but not initialized will be configured to listen for "Transfer Media Request" commands. Upon receipt of a "Transfer Media Request command, the application 11 displays a graphical user interface that notifies the user of the incoming media-based call alert communication and that provides various user-selectable actions (e.g., a graphical pop-up saying "<Calling Party's number> is trying to connect with you with a 'Push Ringer Media Call' and offering the following icons: {Play}, {Decline} or {More}). If the appropriate user-selected action (e.g., {Play}) is selected, the application 11 carries out the required media-based call alert communication processing (e.g., "Ack Transfer Media Request" command, "Send Media Packet" command, "Get/Send Media Entitlement" commands, "Media Received" command as described above) that communicates the pushed media content to the called-subscriber terminal 5 and plays the pushed media content on the called-subscriber terminal 5 prior to (or concurrent with) the establishment of the voice call between the subscriber terminal devices 3,5. If the user declines acceptance of the media-based call alert communication (e.g., selects {Decline}), any download or initialization of the application 11 or delivery of Transfer Media Request command will be terminated, if needed, and the calling subscriber will be prompted with an appropriate display prompt that indicates that media-based call alert communication has been declined and that allows for the user to make a regular voice call to the called subscriber. In this scenario, the called subscriber, who declined, is preferably sent an SMS message explaining the service and how to download the application 11 for future use. If the calling subscriber attempts to initiate media-based call alert communications to a party who does not have a compatible device, the calling subscriber can be prompted with a display indicating that such media-based call alert communication is not possible and that allows for the user to make a regular voice call to the called party.

In the preferred embodiment, there are two different types of media-based call alert communications: "My Ring"-type pushed media communications and "Record Ringer"-type pushed media communications. The "My Ring"-type pushed media communication employs a media file whose content (e.g., audio or video content) is available from a generally-available public source. The "Record Ringer"-type push media communication employs a media file whose content (e.g., audio or video content) is generated or available from a private source. Once registered, a user will immediately be able to select any of the audio, graphical or video files on his or her device for use as media content in originating "My Ring"-type pushed media communications. An exemplary display window for registering and subscribing to a media-based call alert communication service as described herein is shown in FIG. 3.

As described above the application 11 executing on a subscriber terminal device maintains a buddy list, which allows the subscriber to see presence information associated with other known subscribers, to manage who can make media calls to the subscriber (e.g., selectively block or enable media-based call alert communications from other known subscribers), arid to see whether or not the subscriber is blocked or enabled from making media-based call alert communications to other known subscribers. The buddy list can also provide an indication if other known users (who may or may not be subscribers) have a compatible device for receiving media-based call alert communications.

An exemplary graphical display of a buddy list is shown in FIG. 4. Each buddy in the list is displayed in the first column and can be a subscriber or a non-subscriber to the service blames (or other identifiers) can be added, renamed or removed from the buddy list. Preferably, the buddy list is initially populated with all names in a phone book or other data structure maintained by the operating system and core applications 57 of the device. Note that the buddy list may be stored off-device by the service provider.

The second column of the buddy list of FIG. 4 provides the presence information for each buddy. More particularly, if the user has an "opt-in" status, "Yes" is displayed for that buddy in the second column of the buddy list. If the user has an "opt-out" status, "No" is displayed for that buddy in the second column of the buddy list.

The third column of the buddy list of FIG. 4 allows the subscriber to selectively enable or block the receipt of media-based call alert communications for each respective buddy on the list. When a subscriber selects "Yes" for the third column entry for a given buddy, media-based call alert communications from the given buddy are received. Conversely, when a subscriber selects "No" for the third column entry for the given buddy media-based call alert communications from the given buddy are blocked.

The fourth column of the buddy list of FIG. 4 provides indications whether or not the subscriber is blocked or enabled from making media-based call alert communication to buddies on the list. A "Red (No)" indicator in the fourth column entry corresponding to a given buddy represents that the subscriber is blocked from making media-based call alert communications to the given buddy. A "Green/(Yes)" indicator in the fourth column entry corresponding to a given buddy represents that the subscriber is allowed to make media-based call alert communications to the given buddy. An "Unknown/<Check?>" indicator in the fourth column entry corresponding to a given buddy represents that it is unknown whether the subscriber is allowed to make media-based call alert communications to the given buddy. Note that the subscriber can selecting <Check?>, which initiates a media-based call alert communication to the Buddy with the intention of both technically probing the capability of that Buddy's device and requesting permission to make media-based call alert communications to that Buddy's device.

Note that the "Advanced" option is only available to subscribers and allows for more detailed control over permissions, such as what kinds of media calls the subscriber will accept from Buddies (e.g., Accept All (default), Decline All Record Rings, Decline All My Rings). The subscriber can also set usage rights for his or her outgoing media-based call alert communications. For example, for "Record Ring"-type pushed media communication, such permissions can selectively allow/block the buddy from saving the recorded media content and/or can selectively allow/block the buddy from forwarding the recorded media content.

In the preferred embodiment, the application 11 provides a graphical user interface that makes the initiation of media-based call alert communications as easy as making a regular phone call. The first step is to click on a name/number to call from the Phone Book or the Buddy List, which results in an extended option menu being displayed that allows for user selection of a "Normal Call" <default> and a media-based call alert communication (e.g., "My Ring"-type or "Record Ringer"-type pushed media communication).

If the "Normal Call" selection is made, a regular call is made to the user/buddy's phone will ring with the ringtone played in accordance with the voice call processing functionality of the user's/buddy's phone.

If the "My Ring"-type selection is made, the user interacts with a graphical user interface to select media content (audio file or video file) from the media store on the subscriber's device. Preferably, the graphical user interface presents the user with selection options including "Same", "New" (default) or "Search". The result of each selection is as follows:

The "New" display pops up a browser set to the media directory(ies) on the subscriber's device and with which the subscriber may browse to any particular file in his or her media directory; with the selection of each title an option to "Preview" and "Use" will appear. If the desired media content cannot be found, the browser will offer the option to "Search" a content storefront for other media content that can be purchased and used. As soon as "Use" is selected for media content, the selected media content is integrated as part of the "My-Ring"-type pushed media communication as described above.

The "Same" display selects the media content that the calling subscriber had selected before for this particular Buddy; if no prior selection was made, the "Same" selection will operate the same as "New". The selected media content is integrated as part of the "My-Ring"-type pushed media communications as described above.

The "Search" display pops up an integrated content storefront offering a list of the "Top 10 Choices" (displayed from local data while the application connects in the background to a fully searchable list of titles). The $11^{th}$ choice on the "Top 10 Choices" list is "Top Categories" the selection of which offers five top sub-categories of media content, including "Top Songs", "Top Seasonal", "Top Greetings", "Top Film/TV" and "Top Humor" sub-categories each of which displays ten titles; with each title is the option to "Preview", the purchase price and "Buy". As soon as media content is purchased (selects "Buy"), "Buy for Me" or "Buy for Buddy (Gift)" options pop up. If "Buy for Me" is selected, the title is downloaded to the subscriber's device, and the selected media content is integrated as part of the "My-Ring"-type pushed media communications as described above. From then on, until a different title is selected for making media-based call alert communications to that Buddy, that title will appear as the "Same" title selection wherein the subscriber calls the same Buddy or number. If "Buy for Buddy (Gift)" is selected the selected media content is integrated as part of the "My-Ring"-type pushed media communications as described above. Note that during and after the particular media-based call alert communication, the called subscriber is preferably offered the option to "Save (Gift)" the content title.

If the "Record Ringer"-type selection is made, the graphical user interface is updated to prompt the user to select a recording mode (e.g., "Record Audio" mode, "Record Video" mode, possibly "Record Streaming Audio" mode, and possibly "Record Streaming Video" mode). Each selection will open up a recorder screen and begin recording the selected source while displaying {Stop} and {Quit} buttons.

In the "Record Audio" mode, recording commences immediately using the device's microphone, displaying two new options on the calling subscriber's device—{Stop} and {Quit}. An additional option button will allow the subscriber to take a picture, or select one from the photo library on his or her device, for display on the called subscriber's device while the audio recording plays. In the "Record Video" mode, recording commences immediately using the device's video camera, displaying two new options oil the calling subscriber's device {Stop} and {Quit}. Recordings are limited to a maximum period of time, e.g., 15 seconds. After the recording is complete, the application 11 will offer the option to "Review" or "Use" ("Use" is the default). "Review" will offer you the option to "Record Again" or "Use" ("Use" is the default). When you select "Use", the recorded media content is integrated as part of the "Record Ringer"-type pushed media communications as described above.

In the preferred embodiment, any telephony device can experience an incoming call mediated by the media-based call alert application as described above, provided that the device has compatible equipment, the application has been downloaded and installed, and media-based call alert communications have not been blocked by the calling subscriber. Once a media-based call alert communication has been initiated from the calling subscriber's side, the calling subscriber will listen on the line until the called subscriber has made one of several possible responses to the media-based call alert communication based on the called subscriber's equipment capabilities and preferences. On the calling subscriber, all incoming media-based call alerts will play once through and will then loop until the called subscriber responds (e.g., Accept, Decline) or the call is transferred to voicemail. The media-based call alerts are programmed to play (immediately or after being paused or snoozed) on the called subscriber's device only once and self-delete, except in the case where a "Record Ringer"-type announcement is saved for later review.

On the called subscriber side, while the incoming media-based call alert is playing, the graphical user interface presented to the called subscriber will preferably display the following options for response: {Accept}, {Hold}, {Snooze} {Decline} and {Block}. Each of these options triggers a further action, as follows.

The {Accept} option accepts the voice call (e.g., answers the phone) and pops up {Disconnect}, {Forward} and {Block} options for the in-call phase.

The {Hold} option pauses the playback of the incoming media-based call alert and pops up {Unhold/Resume} {Accept}, {Disconnect} and {Block} on the display window of the called-subscriber terminal device 5 and preferably notifies the calling subscriber on his or her display that the call request is on hold.

The {Snooze} option declines the call and the connection and connects the calling subscriber and the called subscriber five, ten or fifteen minutes later (as determined by the setting on the called subscriber's application) and notifies the calling subscriber on his or her display device that the call will be reconnected in five, ten or fifteen minutes.

The {Decline} option declines the call with no explanation to the calling subscriber.

The {Block} option declines the call and updates the permissions on the called subscriber's device such that the calling subscriber is blocked from making media-based call alert communications to the called subscriber. The called subscriber can re-enable the calling subscriber's permission at any time by management of the buddy list as described above.

In certain situations {Other} may appear as an additional option to offer the user additional responses, including transmitting the other party one of a selection of "canned" textual messages (e.g., "Can't Talk Now") that will appear on the display screen of the recipient's devices.

At the termination of each media-based call alert mediated call, the called subscriber is preferably presented with a graphical user interface that enables the called subscriber to buy, save and/or forward the media content communicated thereto as the media-based call alert. More particularly, the graphical user interface preferably displays a {Save/Buy} option, a {Save/Gift} option, a {Save} option, and a {Forward} option.

The {Save/Buy} option allows the called subscriber to buy and save the media content presented by the calling subscriber for the called subscriber to keep and use in accordance with the DRM restriction associated therewith. In this way so-called viral or pass-along marketing of media content is built into the service where applicable, and calling subscribers may be rewarded for content sales resulting from called subscriber purchases with loyalty points that can be redeemed against future media call purchases or services.

The {Save/Gift} option allows the called subscriber to save the media content presented by the calling subscriber for the called subscriber to keep and use in accordance with the DRM restriction associated therewith in the event that it has been gifted by the calling subscriber (or possibly gifted by a marketing service that gifts media content to select subscribers).

The {Save} option applies to "Recorded-Ring"-type pushed media communications and allows the called subscriber to save the media content of the media-based call alert in the event that the calling subscriber has set "Save" rights for this called subscriber to allow for saving the calling subscriber's recordings.

The {Forward} option applies to "Recorded-Ring"-type pushed media communications and allows the called subscriber to forward the media content of the media-based call alert depending on the intent of the calling subscriber and the associated DRM rights and permissions programmed into the underlying media content.

On the calling subscriber side, once the media-based call alert communication has been initiated all status and progress information generated and/or captured by the query server 9 may be communicated to the calling-subscriber terminal device 3 where a user interface on the display screen of that device can indicate applicable status or progress information and optionally provide instances of response or interactivity to the status or progress information.

For example, in a case wherein the called subscriber {Decline} the attempted media-based call alert communication, the calling subscriber may be offered a pop-up button on the user Interface to allow him or her to save the media announcement on the network for later re-use or to retry the media-based call alert communication with a {Urgent} notice.

In another example, in a case wherein the called subscriber places the incoming media-based call alert communication on {Hold}, the calling subscriber may be offered a pop-up button on the user interface to indicate to him or her that the called subscriber has the media-based call alert communication on a temporary hold, or to allow the calling subscriber to change media-based call alert communication to a {Snooze} connection attempt that will be automatically re-attempted by the query server 9 at a later time (e.g., 2, 5, 10 or 15 minutes later).

In yet another example, in a case wherein the called subscriber has set up a particular image, sound or video clip in a "ringback tone" type of configuration, the calling subscriber may be displayed that particular image, sound or video clip on the user interface while the calling subscriber is waiting for the called subscriber to respond to the incoming media-based call alert communication. The communication of the 'ringback tone' between the called subscriber terminal and the calling subscriber terminal may also carry data that represents one or more interactive messages or elements (e.g., "is this call important? (Yes/No)") that is displayed on the user interface of the calling subscriber terminal. Such data can be communicated from the called subscriber terminal to the calling subscriber terminal at the option of the called subscriber via user interaction in conjunction with the incoming media-based call alert communication (or possibly by setting parameters associated with incoming media-based call alert communications for all users and/or for individual subscribers on the buddy list of the called subscriber). The calling subscriber can respond to the interactive message ("Yes"— the call is important) and the response communicated from the calling subscriber terminal to the called subscriber terminal, where it is displayed to the called subscriber. The called subscriber can then use the calling subscriber's response in deciding the called subscriber's response (e.g., {Accept}, {Hold}, {Snooze} {Decline} and {Block}) for the incoming media-based call alert communication as described above.

In other example, other types of progress reporting and interactive options for the calling subscriber may be offered that are peculiar to the kind of media-based call alert communication that is made.

Figure 5:
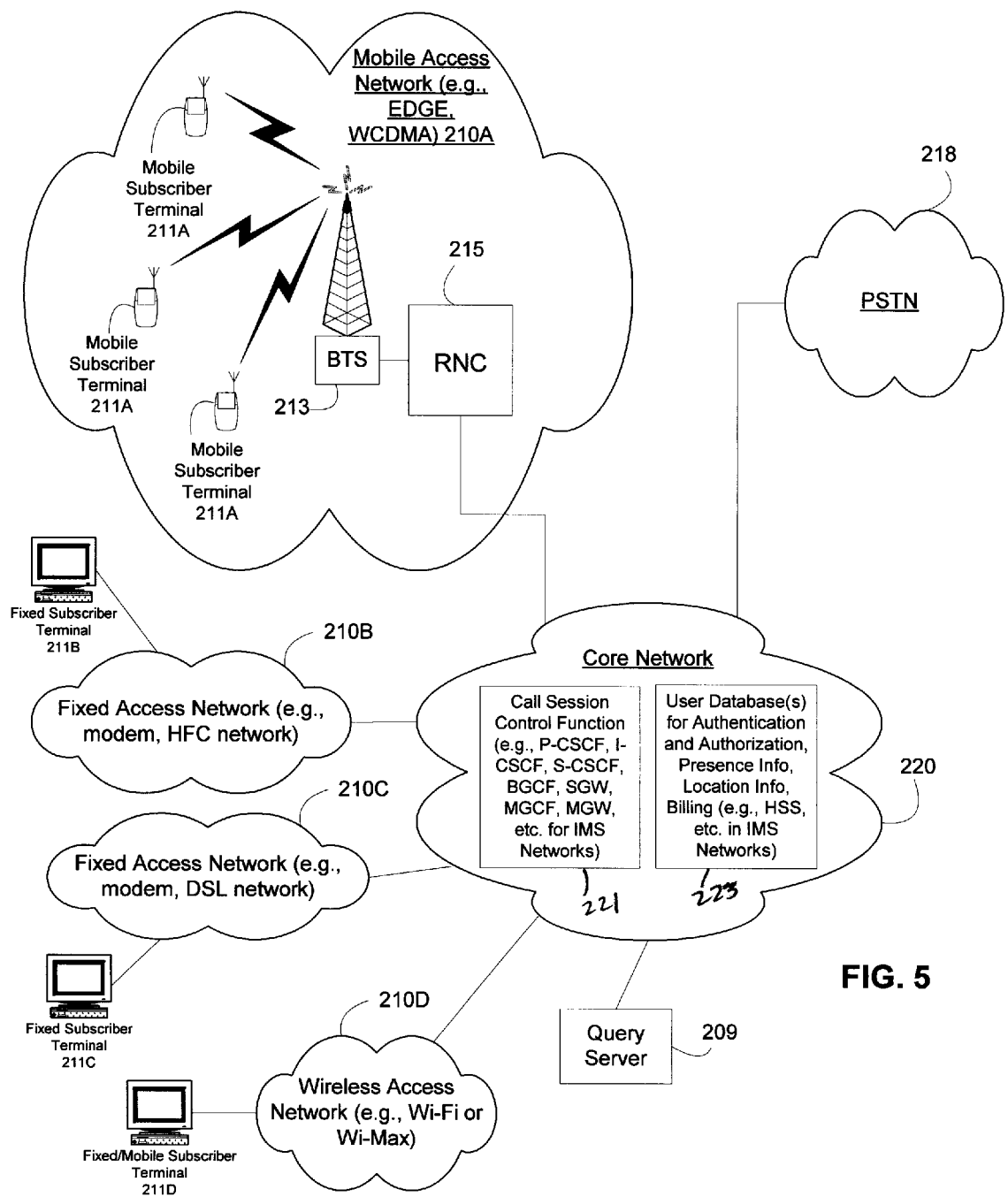
FIG. 5 is a functional block diagram of an exemplary communication system that includes a variety of different access networks (mobile, fixed and wireless access networks) and that supports peer-to-peer voice call communications which employ push-type communication of a media-based announcement from a calling-subscriber device to a called-subscriber device in accordance with the present invention.

Turning now to FIG. 5, there is shown a functional block diagram of an exemplary communication system that includes a variety of different access networks (mobile, fixed and wireless access networks). Mobile subscriber terminals 211A communicate over wireless communication links to a mobile access network 210A. The mobile access network 210A includes a plurality of base stations 213 (one shown) that are operably coupled to radio network controllers 215 (one shown). The radio network controllers 215 are responsible for radio resource allocation to the mobile subscriber terminals 211A, and for frequency administration and handover between base stations 213. The radio network controller function may be physically located within a base station 213 itself.

Each base station 213 includes at least one antenna and a group of one or more radio transmitter-receiver pairs. Each transmitter-receiver pair operates on a pair of radio frequencies to create a communication channel: one frequency to transmit radio signals to a mobile subscriber terminal 211A and the other frequency to receive radio signals from the mobile subscriber terminal 211A. Each base station 213 defines a cell of the mobile access network 210A, which is a predetermined volume of space radially arranged around its antenna. In order to prevent the radio signals transmitted from one base station from interfering with radio signals transmitted from an adjacent base station, the transmitter frequencies for adjacent base stations are selected to be different so that there is sufficient frequency separation between adjacent transmitter frequencies. In order to reuse the same frequencies, the cellular telecommunication industry has developed a small but finite number of transmitter frequencies and allocation patterns that ensure that adjacent cell sites do not operate on the same frequency. When a mobile subscriber terminal 211A initiates a call connection, control signals transmitted from the local base station 213 cause the frequency agile transponder in the mobile subscriber terminal 211A to operate at the frequency of operation designated for that particular base station. As the mobile subscriber terminal 211A moves from one cell to another, the call connection is handed off to the successive base station and the frequency agile transponder in the mobile subscriber terminal 211A adjusts its frequency of operation to correspond to the frequency of operation of the base station 213 located in the cell in which the mobile subscriber terminal 211A is presently operational.

Numerous technologies, such as EDGE technology and W-CDMA technology, can be used to implement the mobile access network 210A. EDGE technology provides enhanced GPRS services, which can be used for any packet switched applications such as an Internet connection. High-speed data applications such as video services and other multimedia services benefit from the increased data capacity provided by the enhanced GPRS services. W-CDMA technology employs wideband code division multiplexing technology to provide high speed packet switched data rates that is suitable for high-speed data applications such as video services and other multimedia services.

Fixed Subscriber terminals 211B communicate over communication links to a fixed access network 210B (e.g., a cable modem coupled to a hybrid fiber coax data network) as is well known. Fixed Subscriber terminals 211C communicate over communication links to another fixed access network 210C (e.g., a DSL modem coupled to a DSL access network) as is well known. Fixed or Mobile Subscriber terminals 211D communicate over communication links to a wireless access network 210D (e.g., a Wi-Fi or Wi-Max access network) as is well known. The mobile subscriber terminals 211A can be any of a number of communication devices including cellular handset devices, personal digital assistants, laptop computers, personal computers, networked kiosks, and the like. The subscriber terminals 211B, 211C, 211D can be any of a number of communication devices including personal computers, laptop computers, personal digital assistants, networked kiosks, VOIP phones, traditional phones connected to VOIP gateways, and the like.

The subscriber terminals 211A, 211B, 211C, 211D connect to the respective access networks using various methods based upon the standard Internet Protocol (IP). The access networks 210A, 210B, 210C, 210D interface to a core network 220 that provides the signaling functions that are necessary to establish voice over IP calls to and from the subscriber terminals. The core network 220 also preferably interfaces to the Public Switched Telephone Network 220 to allow for voice over IP calls to be transformed into a form suitable for communication over the PSTN.

The communication system of FIG. 5 supports peer-to-peer voice over IP call communications which employ push-type communication of a media-based announcement from a calling-subscriber terminal device to a called-subscriber terminal device in accordance with the present invention.

The core network 220 provides call session control functionality 221 and user database functionality 223. The call session control functionality 221 sets up/modifies and tears down sessions between the subscriber terminal devices. The user database functionality 223 maintains information relating to subscribers, such as authentication and authorization information, presence information, location information, billing information. The call session control functionality 221 preferably supports the standardized SIP protocol and can be realized by a variety of network architectures (e.g., SIP Network, IMS Network) based thereon. A SIP Network includes a set of network elements (e.g., Registrar, Location Server(s), Proxy Server(s), Redirect Server(s)) for supporting the SIP protocol. An IMS Network is based upon the SIP protocol and embodies a set of network functions (including P-CSCF, I-CSSF, S-SCSF, BGCF, SGW, MGCF, MGW) for setting up, modifying and tearing down sessions between the subscriber terminal devices. It also includes a Home Subscriber Server (HSS), which is a master database containing subscriber-related information, such as authentication and authorization information, presence information, location information, billing information.

Figure 6A:
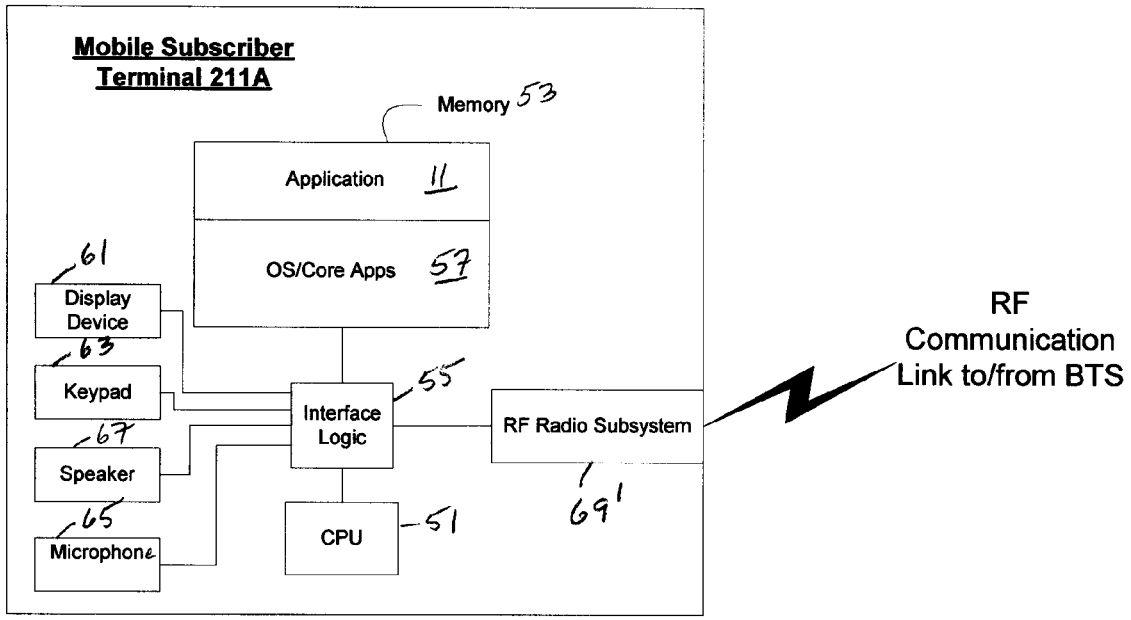
FIGS. 6A and 6B are functional block diagrams of subscriber terminal devices of FIG. 5 in accordance with the present invention.
Figure 6B:
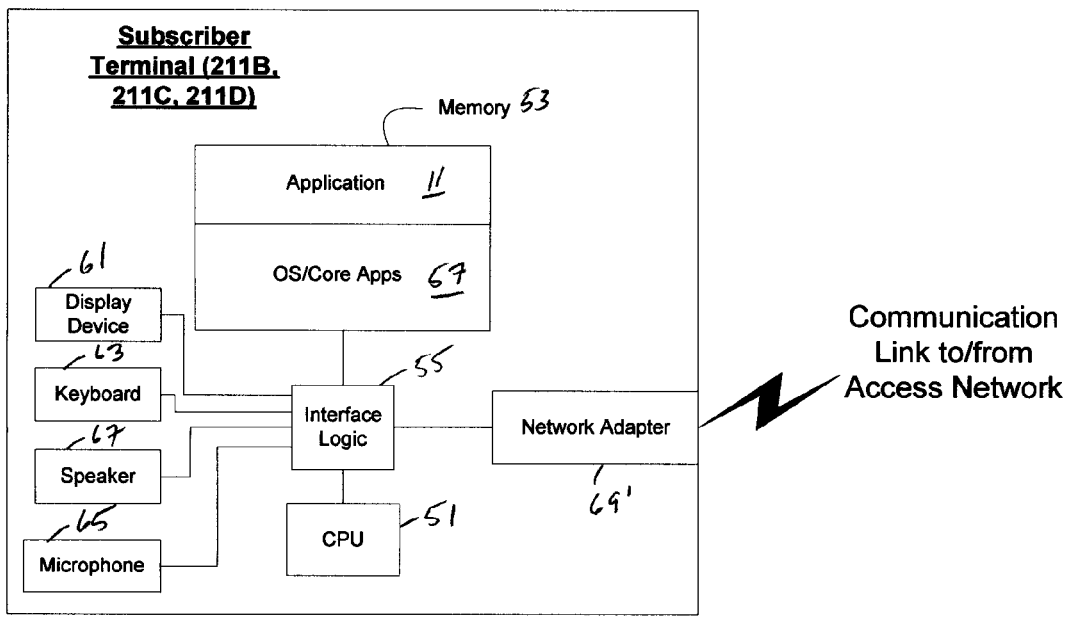

The mobile subscriber terminals 211A embody the media-based call alert communication application 11 as described herein and shown in the exemplary architecture of FIG. 6A. Similarly, the subscriber terminals 211B, 211C, 211D embody the media-based call alert communication application 11 as described herein and shown in the exemplary architecture of FIG. 6B. A query server 209 interfaces to the core network 220. The query server 209 embodies the functionality of the query server 9 as described herein. The query server 209 exchanges subscriber-related information (e.g., subscriber presence information) with the user database functionality 223 of the core network 220 preferably by a standardized mechanism (e.g., OSA/ParlayX services). In alternative embodiments, the query server 209 can be part of the functionality of the core network 220 and/or can interface to (or possibly be part of) one of the access networks 210A, 210B, 210C, 210D. The functionality of the query server 209 can also possibly be distributed amongst multiple network elements that are interfaced to (or part of) different parts of the communication system. The subscriber terminals 211A, 211B, 211C, 211D communicate to one another and to the query server 209 over sessions (preferably SIP sessions) that carry information via TCPIP packets communicated therebetween in order to carry out the media-based call alert communication processing described herein.

There have been described and illustrated herein several embodiments of a system and method for communication of media-based call alert from a calling-subscriber device to a called-subscriber device over one or more communication networks. The media-based call alert is communicated to the called-subscriber device prior to establishing the voice call between the calling-subscriber device and the called-subscriber device. The media-based call alert is played on the called-subscriber device prior to (or concurrent with) the establishment of the voice call therebetween. While particular embodiments of the invention have been described, it is not intended that the invention be limited thereto, as it is intended that the invention be as broad in scope as the art will allow and that the specification be read likewise. Thus, while particular communication technologies, system architectures, device architectures and message formats have been disclosed, it will be appreciated that other current and future communication technologies, system architectures, device architectures and message formats can be used as well to carry out the media-based call alert communication processing of the present invention as described herein. For example, the management of subscriber-related information as well as call session control can be carried out by a protocol different from the SIP protocol (or those networks based thereon). Such a protocol might be standardized protocol or possibly proprietary depending upon the application. In another example, the subscriber's presence information maintained by the query server of the service can possibly represent a series of "opt-in" states, for example, a "voice only opt-in" state (meaning that the subscriber is available only for voice call communication initiated as part of the service and not for data communication initiated as part of the service), a "data only opt-in" state (meaning that the subscriber is available only for data communication initiated as part of the service and not for voice call communication initiated as part of the service for only voice call communication initiated as part of the service, opt-in for only data), or other states. Such presence states are updatable by subscribers and maintained by the query server. Such presence states are used to selectively initiate (or not initiate) communication to subscribers of the service on a per call basis. Moreover, the service may be open to registered users (or possibly other user classes) and thus not require subscription. In addition, while particular graphical user interfaces have been disclosed, it will be understood that other graphical user interfaces can be used. It will therefore be appreciated by those skilled in the art that yet other modifications could be made to the provided invention without deviating from its spirit and scope as claimed.

What is claimed is:

1. A system for communicating a multimedia announcement from a calling party to a called party as part of a voice call therebetween, the system comprising:

a calling party device operated by the calling party, a called party device operated by the called party, and a sewer operably coupled to said calling party device and to said called party device over a communication network therebetween;

wherein said server includes or interfaces to at least one database for storing presence data and permissions data for a plurality of users, wherein presence data associated with a given user represents availability of the given user, wherein permissions data associated with a given user represents whether communication of multimedia announcements to the given user should be selectively allowed or blocked, and wherein presence data and permissions data for the called party is specified by communication from said called party device;

wherein said calling party device includes first means for identifying the called party, second means for selecting a given multimedia announcement, third means for communicating with said server to determine serviceability of the called party based upon said presence data and said permissions data for the called party, and fourth means for selectively initiating communication of the given multimedia announcement from said calling party device to said called party device based upon serviceability of the called party as determined by said third means; and wherein said called party device includes means for receiving the given multimedia announcement and means for playing the given multimedia announcement in conjunction with a call made from said calling party device to said called party device over said communication network.

2. A system according to claim 1, wherein:
said called party device include means for updating presence data and permissions data for the called party as stored in the at least one database in accordance with user input provided by the called party, and said calling party device includes means for updating the presence data and permission data for the calling party as stored in the at least one database in accordance with user input provided by the calling party.

3. A system according to claim 2, wherein:
said called party device includes a graphical user interface for updating presence data and permissions data for the called party, and said calling party device includes a graphical user interface for updating presence data and permissions data for the calling party.

4. A system according to claim 1, wherein:
the presence data for the called party represents general availability of the called party.

5. A system according to claim 1, wherein:
the permission data for the called party includes data uniquely associated with the calling party that represents whether communication of any multimedia announcement from the calling party to the called party should be allowed or blocked.

6. A system according to claim 1, wherein:
said calling party device and said called party device each include a list of users and associated permission information displayed thereon.

7. A system according to claim 1, wherein:
said fourth means selectively initiates communication of the given multimedia announcement from said calling party device to said called party device in the event that the presence data for the called party represents that the called party is generally available and the permission data for called party represents that communication of any multimedia announcement from the calling party device to the called party device should be allowed.

8. A system according to claim 1, wherein:

said fourth means does not initiate communication of the given multimedia announcement from said calling party device to said called party device in the event that the presence data for the called party represents that the called party is generally not-available, and said fourth means does not initiate communication of the given multimedia announcement from said calling party device to said called party device in the event that the presence data for the called party represents that the called party is generally available and the permission data for called party represents that communication of any multimedia announcement from the calling party device to the called party device should be blocked.

9. A system according to claim 1, wherein:

communication of the given multimedia announcement from the calling party device to the called party device includes communicating from the calling party device to the called party device a first command that identifies the given multimedia announcement and information related thereto, wherein the called party device receives and analyzes information contained in said first command to determine if the given multimedia announcement can be received and processed by the called party device, and returns a first reply that indicates whether the given multimedia announcement can be received and processed by the called party device.

10. A system according to claim 9, further comprising:

in the event that said first reply indicates that the given multimedia announcement can be received and processed by the called party device, communicating from said calling party device to said called party device a second command that includes at least the given multimedia announcement.

11. A system according to claim 10, further comprising:

in the event that said first reply indicates that the given multimedia announcement cannot be received and processed by the called party device, communicating from said calling party device to said server a third command that includes at least the given multimedia announcement, wherein said server processes said third command and forwards the given multimedia announcement to said called party device in a form suitable for processing by said called party device.

12. A system according to claim 11, wherein:

in processing said third command, said server transcodes the given multimedia announcement supplied thereto by the calling party device.

13. A system according to claim 11, wherein:

in response to successful receipt of the given multimedia announcement, said called party device communicates to said calling device a fourth command that indicates successful receipt of the given multimedia announcement, said calling party device receiving said fourth command and initiating the call from said calling party device to said called party device over said communication network in response to said fourth command.

14. A system according to claim 13, wherein:

initiation of the call from said calling party device to said called party device requests provisioning of resources of said communication network for the call subsequent to receiving said fourth command.

15. A system according to claim 13, wherein:

in conjunction with initiating communication of the fourth command, said called party device adapts the incoming call processing carried out by said called party device such that any incoming call originating from said calling party device will be announced by playing the given multimedia announcement.

16. A system according to claim 15, wherein:

the incoming call processing carried out by said called party device compares caller identifier information for each incoming call and automatically invokes an application for playing the given multimedia announcement in the event that the caller identifier information corresponds to an identifier assigned to said calling party device.

17. A system according to claim 1, wherein:

the given multimedia announcement is stored in a file that is protected by a digital rights management mechanism for controlling access thereto.

18. A system according to claim 17, wherein:

said called party device acquires digital rights management license information that allows access to the file storing the given multimedia announcement for at least playing the given multimedia announcement on said called party device.

19. A system according to claim 18, wherein:

said digital rights management license information controls access to the file storing the given multimedia announcement for other functions selected from the group including: allowing the file to be copied and/or saved on the called party device, prohibiting the file to be copied and/or saved on the called party device, allowing the file to be used only for intended purposes, prohibiting the file to be used for non-intended purposes, allowing the file to be forwarded to another device, prohibiting the file to be forwarded to another device, allowing the file to played a certain number of times and then automatically deleted from the called party device, and allowing the file to played until a certain date and then automatically deleted from the called party device.

20. A system according to claim 18, wherein:

said server supplies said digital rights management license information to said called party device.

21. A system according to claim 1, wherein:

said called party device is adapted to announce the call made from said calling party device to said called party device by playing the given multimedia announcement and to communicate at least one interactive message between said called party device and said calling party device in conjunction with the call.

22. A method for communicating a multimedia announcement from a calling party to a called party as part of a voice call therebetween, the method comprising:

providing a calling party device operated by the calling party, a called party device operated by the called party, and a server operably coupled to the calling party device and to the called party device over a communication network therebetween, wherein the server includes or interfaces to at least one database for storing presence data and permissions data for a plurality of users, wherein presence data associated with a given user represents availability of the given user, wherein permissions data associated with a given user represents whether communication of multimedia announcements to the given user should be selectively allowed or blocked, and wherein presence data and permission data for the called party is specified by communication from the called party device;

operating the calling party device to identify the called party and select a given multimedia announcement in accordance with user input by the calling party;

communicating between the calling party device and the server to determine serviceability of the called party for communication of the given multimedia announcement from the calling party device to the called party device, the serviceability based upon the presence data and the permissions data for the called party as stored in the at least one database;

selectively initiating communication of the given multimedia announcement from the calling party device to the called party device based upon serviceability of the called party as determined by the communication with the server;

receiving the given multimedia announcement at the called party device; and playing the given multimedia announcement at the called party device in conjunction with a call made from the calling party device to the called party device over the communication network.

23. A method according to claim 22, further comprising:

communicating information from the called party device to update the presence data and permissions data for the called party as stored in the at least one database; and communicating information from the calling party device to update the presence data and permission data for the calling party as stored in the at least one database.

24. A method according to claim 23, further comprising:

presenting a graphical user interface on the calling party device for updating the presence data and permission data for the calling party; and presenting a graphical user interface on the called party device for updating the presence data and permissions data for the called party.

25. A method according to claim 22, wherein:

the presence data for the called party represents general availability of the called party.

26. A method according to claim 22, wherein:

the permissions data for the called party includes data uniquely associated with the calling party that represents whether communication of any multimedia announcement from the calling party to the called party should be allowed or blocked.

27. A method according to claim 22, further comprising:

displaying a list of users and associated permission information on each of the calling party device and the called party device.

28. A method according to claim 22, wherein:

communication of the given multimedia announcement from the calling party device to the called party device is initiated in the event that the presence data for the called party represents that the called party is generally available and the permission data for called party represents that communication of any multimedia announcement from the calling party device to the called party device should be allowed.

29. A method according to claim 22, wherein:

communication of the given multimedia announcement from the calling party device to the called party device is not initiated in the event that the presence data for the called party represents that the called party is generally not-available, and communication of the given multimedia announcement from the calling party device to the called party device is not initiated in the event that the presence data for the called party represents that the called party is generally available and the permission data for called party represents that communication of any multimedia announcement from the calling party device to the called party device should be blocked.

30. A method according to claim 22, wherein:

communication of the given multimedia announcement from the calling party device to the called party device includes communicating from the calling party device to the called party device a first command that identifies the given multimedia announcement and information related thereto, wherein the called party device receives and analyzes information contained in said first command to determine if the given multimedia announcement can be received and processed by the called party device, and returns a first reply that indicates whether the given multimedia announcement can be received and processed by the called party device.

31. A method according to claim 30, further comprising:

in the event that said first reply indicates that the given multimedia announcement can be received and processed by the called party device, communicating from said calling party device to said called party device a second command that includes at least the given multimedia announcement.

32. A method according to claim 31, further comprising:

in the event that said first reply indicates that the given multimedia announcement cannot be received and processed by the called party device, communicating from said calling party device to the server a third command that includes at least the given multimedia announcement, wherein the server processes said third command and forwards the given multimedia announcement to the called party device in a form suitable for processing by the called party device.

33. A method according to claim 32, wherein:

in processing said third command, said sewer transcodes the given multimedia announcement supplied thereto by the calling party device.

34. A method according to claim 32, wherein:

in response to successful receipt of the given multimedia announcement, the called party device communicates to the calling device a fourth command that indicates successful receipt of the given multimedia announcement, the calling party device receiving said fourth command and initiating the call from the calling party device to the called party device over the communication network in response to said fourth command.

35. A method according to claim 34, wherein:

initiation of the call from the calling party device to the called party device requests provisioning of resources of the communication network for the call subsequent to receiving said fourth command.

36. A method according to claim 34, wherein:

in conjunction with initiating communication of the fourth command, the called party device adapts the incoming call processing carried out by the called party device such that any incoming call originating from the calling party device will be announced by playing the given multimedia announcement.

37. A method according to claim 36, wherein:

the incoming call processing carried out by the called party device compares caller identifier information for each incoming call and automatically invokes an application for playing the given multimedia announcement in the event that the caller identifier information corresponds to an identifier assigned to the calling party device.

38. A method according to claim 22, wherein:
the given multimedia announcement is stored in a file that is protected by a digital rights management mechanism for controlling access thereto.

39. A method according to claim 38, further comprising:
communicating digital rights management license information to the called party device, the digital rights management license information allowing access to the file storing the given multimedia announcement for at least playing the given multimedia announcement on the called party device.

40. A method according to claim 39, wherein:
said digital rights management license information controls access to the file storing the given multimedia announcement for other functions selected from the group including: allowing the file to be copied and/or saved on the called party device, prohibiting the file to be copied and/or saved on the called party device, allowing the file to be used only for intended purposes, prohibiting the file to be used for non-intended purposes, allowing the file to be forwarded to another device, prohibiting the file to be forwarded to another device, allowing the file to played a certain number of times and then automatically deleted from the called party device, and allowing the file to played until a certain date and then automatically deleted from the called party device.

41. A method according to claim 39, wherein:
said digital rights management license information is communicated from the server to the called party device in response to a request from the called party device.

42. A method according to claim 22, wherein:
said called party device is adapted to announce the call made from said calling party device to said called party device by playing the given multimedia announcement and to communicate at least one interactive message between said called party device and said calling party device in conjunction with the call.

43. In a communication system including a calling party device operated by the calling party, a called party device operated by the called party, and a server operably coupled to the calling party device and to the called party device over a communication network therebetween, a computer program product that is installed or installable onto a computer processing platform that is part of the calling party device, the computer program product readable by the computer processing platform, tangibly embodying a program of instructions executable by the computer processing platform for communicating a multimedia announcement from a calling party to a called party as part of a voice call therebetween, the computer program product comprising:
means for operating the calling party device to identify the called party and select a given multimedia announcement in accordance with user input by the calling party;
means for communicating between the calling party device and the server to determine serviceability of the called party based upon presence data and permissions data for the called party retrieved from at least one database which is maintained by or interfaced to the server, wherein said presence data for the called party represents availability of the called party, and wherein said permissions data for the called party represents whether communication of the given multimedia announcement to the called party should be selectively allowed or blocked;
means for selectively initiating communication of the given multimedia announcement from the calling party device to the called party device based upon serviceability of the called party as determined by the communication with the server, and
means for automatically initiating a call from the calling party device to the called party device over the communication network upon notification communicated from the called party device that the given multimedia announcement has been successfully received at the called party device, wherein the given multimedia announcement is played at the called party device to announce said call.

44. A computer program product according to claim 43, wherein:
the presence data for the called party represents general availability of the called party.

45. A computer program product according to claim 43, wherein:
the permission data for the called party includes data uniquely associated with the calling party that represents whether communication of any multimedia announcement from the calling party to the called party should be allowed or blocked.

46. A computer program product according to claim 43, wherein:
communication of the given multimedia announcement from the calling party device to the called party device is initiated in the event that the presence data for the called party represents that the called party is generally available and the permission data for called party represents that communication of any multimedia announcement from the calling party device to the called party device should be allowed.

47. A computer program product according to claim 43, wherein:
communication of the given multimedia announcement from the calling party device to the called party device is not initiated in the event that the presence data for the called party represents that the called party is generally not-available, and
communication of the given multimedia announcement from the calling party device to the called party device is not initiated in the event that the presence data for the called party represents that the called party is generally available and the permission data for called party represents that communication of any multimedia announcement from the calling party device to the called party device should be blocked.

48. A computer program product according to claim 43, wherein:
initiation of the call from the calling party device to the called party device requests provisioning of resources of the communication network for said call.

49. A computer program product according to claim 48, further comprising:
receiving the multimedia announcement at the called party device; and
means, operating in response to receipt of the multimedia announcement, for adapting incoming call processing at the called party device such that any incoming call originating from the calling party device will be announced by playing the multimedia announcement communicated therefrom.

50. A computer program product according to claim 49, wherein:

the incoming call processing compares caller identifier information for each incoming call and automatically invokes an application for playing the multimedia announcement in the event that the caller identifier information corresponds to an identifier assigned to the calling party device.

51. A computer program product according to claim 43, wherein:

the given multimedia announcement is stored in a file that is protected by a digital rights management mechanism for controlling access thereto.

52. A computer program product according to claim 43, wherein:

said computer program product is part of a downloadable application that is loaded onto the computer processing platform of the calling party device.

53. A computer program product according to claim 43, wherein:

said called party device is adapted to announce the call made from said calling party device to said called party device by playing the given multimedia announcement and to communicate at least one interactive message between said called party device and said calling party device in conjunction with the call.

* * * * *